United States Patent [19]

Johnson et al.

[11] Patent Number: 4,948,828

[45] Date of Patent: Aug. 14, 1990

[54] ASBESTOS FREE MATERIAL FOR GASSING CURRENT LIMITING FUSES

[75] Inventors: Stephen P. Johnson, Olean, N.Y.; Stephen P. Hassler, Muskego, Wis.

[73] Assignee: Cooper Industries, Inc., Houston, Tex.

[21] Appl. No.: 304,731

[22] Filed: Jan. 31, 1989

[51] Int. Cl.$^5$ ............................ C08K 3/34; C08K 3/22
[52] U.S. Cl. .................................... 524/437; 524/456; 524/597
[58] Field of Search .................. 200/144 C, 149 A; 174/DIG. 1; 524/437, 456, 597

[56] References Cited

U.S. PATENT DOCUMENTS

| | | | |
|---|---|---|---|
| 2,596,134 | 5/1952 | Dorst | 524/597 |
| 2,917,607 | 12/1959 | Sterling | 524/597 |
| 3,242,257 | 3/1966 | Jones et al. | 524/437 |

*Primary Examiner*—Lewis T. Jacobs
*Attorney, Agent, or Firm*—David A. Rose

[57] ABSTRACT

A spider for a gassing current limiting fuse made of an asbestos free material is disclosed. The spider material produces an arc quenching gas and water upon erosion by an arc. The material includes the following proportions of ingredients: 50-80% $Al_2O_3.3H_2O$; 8-22% Wollastonite ($CaSiO_3$); and 10-25% melamine formaldehyde resin.

9 Claims, 2 Drawing Sheets

ASBESTOS FREE MATERIAL FOR GASSING CURRENT LIMITING FUSES

FIELD OF THE INVENTION

The invention relates to an asbestos free material for use as the gas-emitting member in a current limiting gassing fuse.

BACKGROUND OF THE INVENTION

In a conventional current limiting fuse, a fuse element is surrounded by a granular inert material of high dielectric strength, such as sand or finely divided quartz. The fuse element is typically wound onto a support core, or spider. When the element is subjected to a current of fault magnitude and vaporizes, arcing of the current results. The metal and the metal vapors expand into the spaces between the inert material. Contact between the hot arc and the relatively cool granules causes a heat transfer from arc to granules. This dissipates the arc energy but causes very little pressure buildup within the fuse structure. A high resistance results from the vaporization of the fuse element, the removal of metal vapors from the arc path, and the rapid cooling of the arc. The current is limited accordingly.

The resistance increases rapidly. The sand particles in close proximity to the arc become partial conductors at the high temperature of the arc. However, fused particles cool on extinction of the arc and solidify into a fulgurate, which is similar to a glass body and is an insulator.

In order to insure against surge voltage peaks in excess of predetermined limits, the fuse element may have a variable cross sectional area. It has areas of reduced cross sectional area between areas of large cross section. This arrangement can be accomplished by, for example, punching a series of circular perforations in a ribbon fuse. The edges of the perforations form the areas of reduced cross section. These areas of reduced cross section cause progressive insertion of arc resistance into the circuit. In turn, this keeps the rate of current change relatively low. As a result, this tends to limit the inductive surge voltage which may occur when a current limiting fuse operates, which otherwise might damage circuit insulation.

A gassing current limiting fuse is an improvement over that described above. In such a gassing fuse, the spider which supports the main fuse element, or at least the portions of the spider which contact the main fuse element, are made of a material which generates an arc quenching gas when contacted and eroded by the heat from an arc. Such materials include, for example, molded thermosetting compositions which include a water insoluble binder and an anti-tracking substance such as hydrates or oxides of aluminum and magnesium. The material can also include various fillers, for example, mica, glass, fiber, asbestos or silicon. One suitable material comprises about 75 percent aluminum hydrate filler, 20 percent polyester resin, and 5 percent glass fiber. See U.S. Pat. No. 3,294,936 at col. 3, lines 43 et seq.

The gas which is generated upon erosion by the arc cools the decaying fuse element and fulgurate, and also provides a high resistance to further current flow. In this manner high current flow which could damage the circuit is impeded, and heat is dissipated. As in a conventional fuse, the fuse element is surrounded by sand or finely divided quartz which forms a fulgurate when exposed to an arc and further aids in limiting the current.

The spider in gassing fuses is conventionally formed of an asbestos-containing material. The problems with the use of asbestos are well-known. Asbestos fibers and dust are a significant health hazard, and can cause, among others, the conditions known as asbestosis and mesothelioma. Asbestos dust can be generated both during manufacture and during disposal of conventional gassing spiders. Due to worker injury, significant liability for both manufacturers and disposers of asbestos products has become common-place. Accordingly, elimination of asbestos from gassing fuses is desirable.

Thus, what is needed is a spider material which is asbestos free, but which nevertheless functions to quench the arc.

SUMMARY OF THE INVENTION

The present invention includes a spider material which is asbestos free, and yet is well-suited for use in current limiting gassing fuses. A gassing fuse is especially useful in low fault current applications. The spider material is made up of $Al_2O_3.3H_2O$, $CaSiO_3$ (known as "Wollastonite"), and melamine formaldehyde resin. The spider material preferably includes the ingredients in the following-range of proportions:

| | |
|---|---|
| 50–80% | $Al_2O_3.3H_2O$ |
| 8–22% | Wollastonite; and |
| 10–25% | melamine formaldehyde resin. |

A preferred embodiment has the following proportions of ingredients:

| | |
|---|---|
| 70% | $Al_2O_3.3H_2O$ |
| 12% | Wollastonite; and |
| 18% | melamine formaldehyde resin. |

The spider material of the present invention is used to support a fuse element, and when contacted by an arc, generates an arc quenching gas as well as water. It can be used for all the same purposes as a conventional asbestos-containing arcquenching material, but does not suffer from the health-related problems associated with asbestos use.

Other objects and advantages of the invention will appear from the following description.

BRIEF DESCRIPTION OF THE DRAWINGS

For a detailed description of a preferred embodiment of the invention, reference will now be made to the accompanying drawings wherein.

DESCRIPTION OF THE PREFERRED EMBODIMENTS

Figure 1:
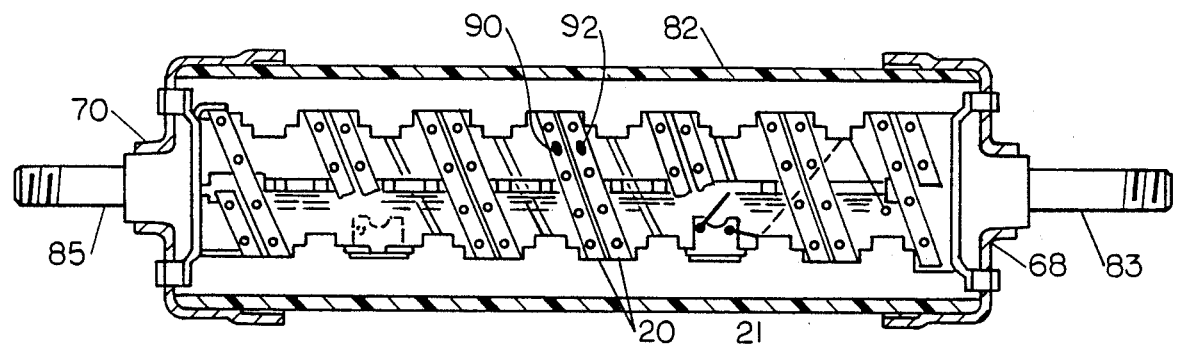
FIG. 1 is a side view, partially in cross section, of a current limiting fuse utilizing the spider material of the present invention.

Referring initially to FIG. 1, there is shown one embodiment of a gassing current limiting fuse 21 having included therein a spider 10 made of the asbestos free material of the present invention. Fuse 21 includes a main fuse element 20 wrapped around the spider 10 and housed within a fuse tube 82. Conducting end caps 68, 70 are fitted over the ends of tube 82 to encapsulate fuse element 20 and spider 10 therewithin. Studs 83, 85 are affixed to each end cap 68, 70 respectively for conducting current through the fuse 21.

Figure 2:
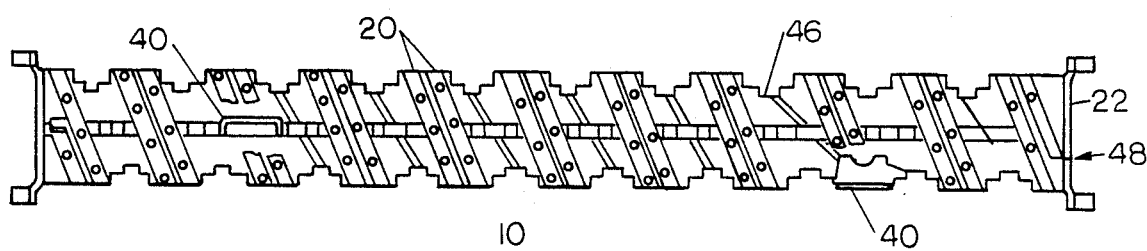
FIG. 2 is a side view of a spider subassembly of the current limiting fuse shown in FIG. 1.
Figure 3:
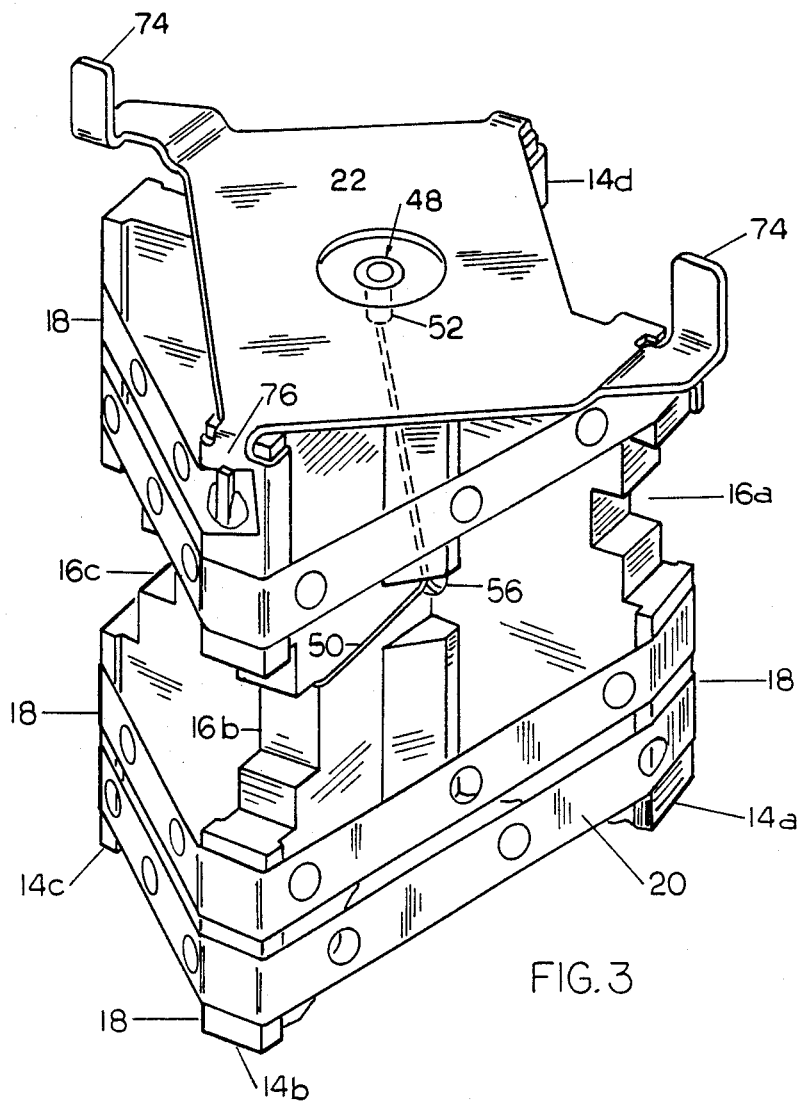
FIG. 3 is a perspective view of one end of the spider subassembly shown in FIG. 2.

Referring now to FIGS. 2 and 3, the spider 10 has four radially protruding fins 14. Each fin 14a, 14b, 14c and 14d includes a series of alternating depressions 16a, 16b, 16c and 16d (the latter not shown), respectively, which extend longitudinally on each fin 14. Each pair of successive depressions 16 forms a series of raised shoulders 18 on each fin.

Depressions 16 are staggered along the spider 10. As best seen in FIG. 3, depression 16a on fin 14a is elevated from depression 16b on fin 14b, which in turn is elevated from depression 16c on fin 14c, such elevations being measured from the central axis of the fuse 21. The depressions 16 and raised shoulders 18 define a continuous helical path for the main fuse element 20.

The asbestos free spider material for the spider 10 includes the ingredients $Al_2O_3.3H_2O$, Wollastonite ($CaSiO_3$), and melamine formaldehyde resin. This material is suitable for any application in which a conventional gassing fuse material can be employed.

To make the spider material of the invention, the foregoing ingredients are mixed and a small amount of acetic acid (less than 1%) is added, with blending. Thereafter, this mixture is packed into a mold having a desired shape. Later, it is removed from the mold, and then air dried. Air drying for a period of 24 hours is preferred. The mold and the mixture are then heated, preferably to between 200°–300° F., and most preferably to 240° F., and dried. The dried mixture will now have the desired shape.

The proportions of the ingredients in the final dry mixture can range as follows:

| | |
|---|---|
| 50–80% | $Al_2O_3.3H_2O$; |
| 8–22% | Wollastonite; and |
| 10–25% | melamine formaldehyde resin. |

A preferred embodiment of the spider material has the following proportions of ingredients in the final mixture:

| | |
|---|---|
| 70% | $Al_2O_3.3H_2O$; |
| 12% | Wollastonite; and |
| 18% | melamine formaldehyde resin. |

An alternate preferred embodiment of the spider material has the following proportions of ingredients in the final mixture:

| | |
|---|---|
| 65% | $Al_2O_3.3H_2O$; |
| 15% | Wollastonite; and |
| 20% | melamine formaldehyde resin. |

The shape of the mold, and thus of the spider 10, can vary depending on the intended use for the material. A preferred shape for the spider 10, suitable for use in a gassing fuse, is shown in the accompanying drawings and described above.

The embodiment of spider 10 shown in FIGS. 1 to 4 is suitable for use with the preferred gassing, current limiting fuse 21 of the present invention. Conducting end caps 68, 70 at opposite ends of fuse 21 include element terminations 22 having tabs 74 and 76. Tabs 76 are affixed to raised shoulders 18 at end of spider 10 by extending over the shoulders 18 and surrounding them on two sides. This arrangement fastens element 22 firmly to each end of spider 10. Tabs 74 on element 22 mate with a recessed portion in the end wall of each of the end caps 68, 70. This arrangement provides a resilient mounting of spider 10 within the fuse tube 82 of fuse 21.

In fuse 21, main fuse element 20 is spirally wound around raised shoulders 18, and each end of element 20 is connected to a termination element 22 (as shown in FIG. 3). Fuse element 20 includes two spots 90, 92 made of a low melting temperature alloy such as tin-lead solder. Fuse 10 is connected with a circuit through studs 83 and 85. Current flows from the stud 85 to the conducting end caps 68, through tabs 74 and to element termination 22. Main fuse element 20 is connected with element termination 22. The same arrangement of elements is present at the opposite end of fuse 21.

Referring again to FIG. 2, fuse 21 also includes an auxiliary fuse element which has two wires 46 spirally wound around the depressions 16 of spider 10. The ends of wire 46 are connected to respective air gap electrodes 40. Between fuse element 20 and air gap electrodes 40 is an air gap of predetermined size. One side of the auxiliary fuse element wires 46 is connected to conducting end cap 68, through wire 50 and vent indicator wire 62.

Referring now to FIG. 3, fuse 21 includes a wire assembly 48. Assembly 48 has a wire 50 which is threaded through a passage 56 extending from the axial center of one end of spider 10 to a point on the periphery of spider 10, and secured to an eyelet 52 of element termination 22. Wire 50 is then spirally wound around spider 10 in the helical path defined by the depressions 16, and electrically connected to the electrode 40 which is nearest to opening 58 and eyelet 52.

Figure 4:
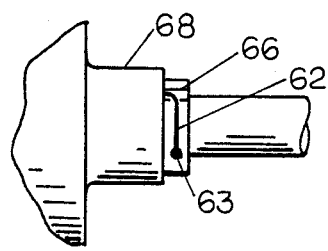
FIG. 4 is a view of one end of the fuse shown in FIG. 1.

Referring now to FIG. 4, at this same end of fuse 21 is a vent indicator wire assembly. A vent wire 62 of high resistance material, for example tungsten or nichrome, is connected to an eyelet which is in the center of the end of fuse 21. This eyelet is connected with eyelet 52 of the auxiliary wire assembly 48. Wire 62 extends through passage 66 in the conducting end cap 68, and to the outside of fuse 21. Wire 62 is soldered to a point 63 on the outside of the conducting end cap 68.

Fuse tube 82 is filled with sand or finely divided quartz. Optionally, an elastomeric gasket can be fitted on the ends of tube 82, and end caps 68 and 70 can be fitted over the gasket. The end caps and gaskets can be sealed with epoxy to provide an air and water-tight seal.

Optionally, second end caps (not shown) can be fitted over conducting end caps 68 and 70. The second end caps compress the gasket (if present) and produce a water-tight seal between the ends of the second end caps and tube 82.

The manner of assembling fuse 10 and its respective parts is explained in more detail in U.S. Pat. No. 4,150,353, incorporated herein by reference.

In operation, a fault current will open the fuse element 20 at two spots 90 and 92, which are preferably made of a low melting temperature alloy such as tin-lead solder. The voltage of the arc across the open section of the main fuse element 20 will also develop the air gap between the other end of auxiliary fuse wires 46 and the main element 20. The arc voltage will increase as the length of the arc increases, eventually causing the air gap at the unconnected end of auxiliary fuse wires 46 to force current flow to the auxiliary indicator circuit, which consists of wires 46 and vent indicator wire 62.

Current flow through the high resistance wire 62 will cause wire 62 to vaporize, providing indication that the fuse has operated. Upon vaporization of wire 62, current flow returns to the main fuse element 20. An examination of wire 62 on the outside of second end cap 78 can be used to indicate whether fuse 21 is operating properly, or has operated.

Figure 5:
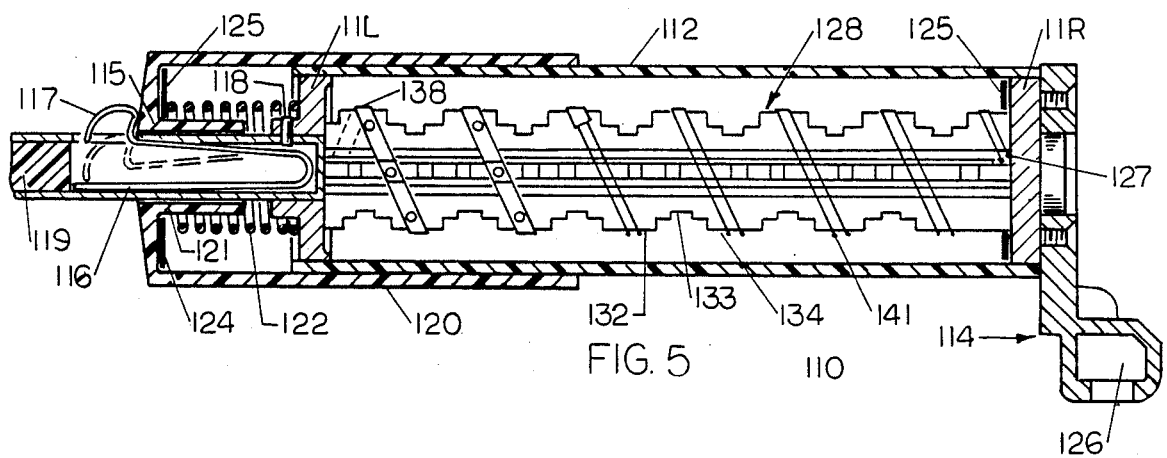
FIG. 5 is a longitudinal cross sectional view of another current limiting fuse in which the spider material of the present invention can be advantageously employed.

Referring now to FIG. 5, there is shown an alternate fuse embodiment for use with the spider material of the present invention. A tubular casing 112 for a current limiting fuse 110 is constructed of suitable insulating material such as glass fiber, or glass fiber impregnated with epoxy resin. A metallic end piece 11R may be secured on the right end of casing 112 by means of any suitable seal such as epoxy cement, and a metallic end piece 11L may have external threads engaging internal threads near the left end of casing 112 to affix end piece 11L to casing 112. A metallic hinge assembly 114 may be secured to the opposite end piece 11R. The end piece 11L has a portion 115 with an axial bore 116. A tubular metallic member 117 extends into axial bore 116 with a force fit and is rigidly secured to end piece 11L by pins 118 extending radially through tubular member 117 and portion 115 of end piece 11L. Terminal member 117 is adapted to fit within a stationary contact jaw (not shown) of an electrical switch, and an insulating member 119 may be secured in the end of tubular member by suitable means such as epoxy cement. An arc extinguishing sleeve 120 slidably fitting over casing 112 may have an inner tubular portion 121 of insulating material telescoped over terminal member 117 and may cover terminal member 117 by a helical spring 122 compressed between end piece 11L and the end portion 124 of arc extinguishing member 120 for the purpose of interrupting any stray arc.

Metallic end plates 125 are disposed against the internal surface of end pieces 11L and 11R and are secured thereto. Each end piece 125 has a plurality of radially extending tabs 127 adjacent its outer periphery which may form terminals to which conductors may be connected. An elongated insulating spider 128 is axially mounted within casing 112. The ends of spider 128 are affixed to end pieces 11R and 11L.

Spider 128 is of generally star-shaped cross section (as described above) with radially extending fins 132. Each fin 132 has a plurality of depressions 133 and raised shoulders 134 as described above. The depressions 133 of peripherally successive fins 132 are progressively staggered to form support means of helical configuration for a helically wound circuit interrupting fuse element 138 interconnecting the end pieces 11L and 11R.

The remainder of the features of fuse 110 are substantially the same as those described above for fuse 21, and as set forth in U.S. Pat. No. 3,294,936. Fuse 110 is connected to a circuit through an eyelet 126 in metallic hinge assembly 114. Assembly 114 is connected with collar 11R, and from there to wire elements 141 and main element 138. The current passes through main fuse element 138 to element 117, which is connected to the circuit.

Although the spider material of the invention has been described as useful with fuse embodiments 21 and 110, it can also be used with virtually any other type of gassing fuse. In addition, the spider material can be used anywhere that arc-tracking resistance is needed. These uses include utilization in high voltage devices as substitute, or a cover over, materials which can track an arc. Because the spider material evolves gas and water in response to an arc, it will quench an arc in any of these situations.

It should be understood that the terms and embodiments described above are exemplary only and not limiting, and that the scope of protection is limited only by the claims which follow, and includes all equivalents of the subject matter of the claims.

What is claimed:

1. An improved material for a spider of a gassing fuse, consisting essentially of the ingredients in substantially the following ranges of proportions:

| | |
|---|---|
| 50–80% | $Al_2O_3.3H_2O$; |
| 8–22% | Wollastonite ($CaSiO_3$); and |
| 10–25% | melamine formaldehyde resin. |

2. The material of claim 1 wherein the proportions of ingredients are as follows:

| | |
|---|---|
| 70% | $Al_2O_3.3H_2O$; |
| 12% | Wollastonite; and |
| 18% | melamine formaldehyde resin. |

3. The material of claim 1 wherein the proportion of ingredients is as follows:

| | |
|---|---|
| 65% | $Al_2O_3.3H_2O$; |
| 15% | Wollastonite; and |
| 20% | melamine formaldehyde resin. |

4. A process for preparing an arc-quenching material, comprising:
preparing a mixture consisting essentially of the following ingredients in the following proportions:

| | |
|---|---|
| 50–80% | $Al_2O_3.3H_2O$, |
| 8–22% | wollastonite, |
| 10–25% | melamine formaldehyde resin; | adding water to the mixture and stirring to form a putty;

molding the putty into a shape desired;
heating the putty; and
drying the putty.

5. The process of claim 4 wherein the water added is substantially in the amount of 7% of the mixture.

6. The process of claim 4 wherein the putty is heated to about 240° F., and is air dried for 24 hours.

7. The process of claim 4 wherein the mixture consists essentially of the following proportion of ingredients:

| | |
|---|---|
| 70% | Al$_2$O$_3$.3H$_2$O; |
| 12% | wollastonite; and |
| 18% | melamine formaldehyde resin. |

8. The process of claim 4 wherein the mixture consists essentially of the following proportion of ingredients:

| | |
|---|---|
| 65% | Al$_2$O$_3$.3H$_2$O; |
| 15% | wollastonite; and |
| 20% | melamine formaldehyde resin. |

9. A product produced by the process as in one of claims 4 through 8.

* * * * *